Oct. 17, 1950  H. WYDLER  2,525,991
FLOWMETER

Filed May 29, 1947  6 Sheets-Sheet 1

Inventor
H. Wydler
By Glascock Downing Seehle Attys

Oct. 17, 1950     H. WYDLER     2,525,991
FLOWMETER
Filed May 29, 1947     6 Sheets-Sheet 2
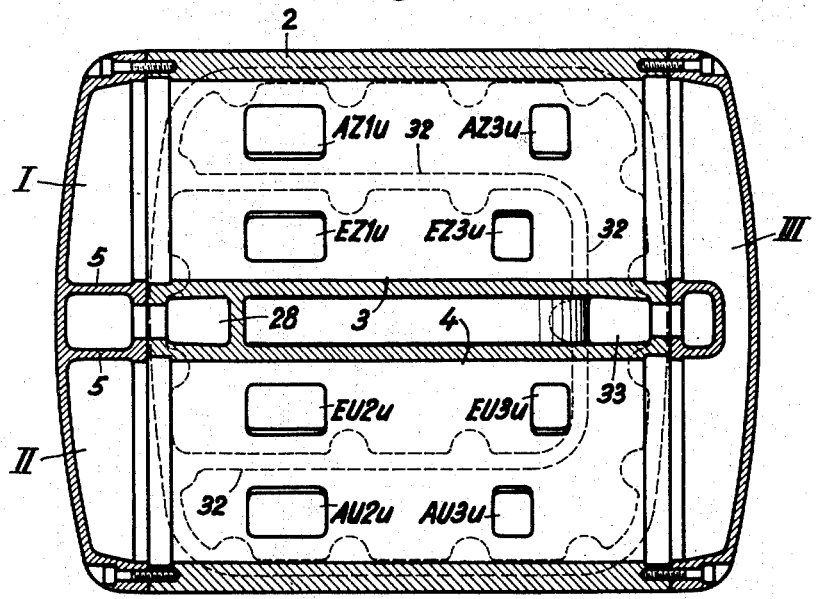
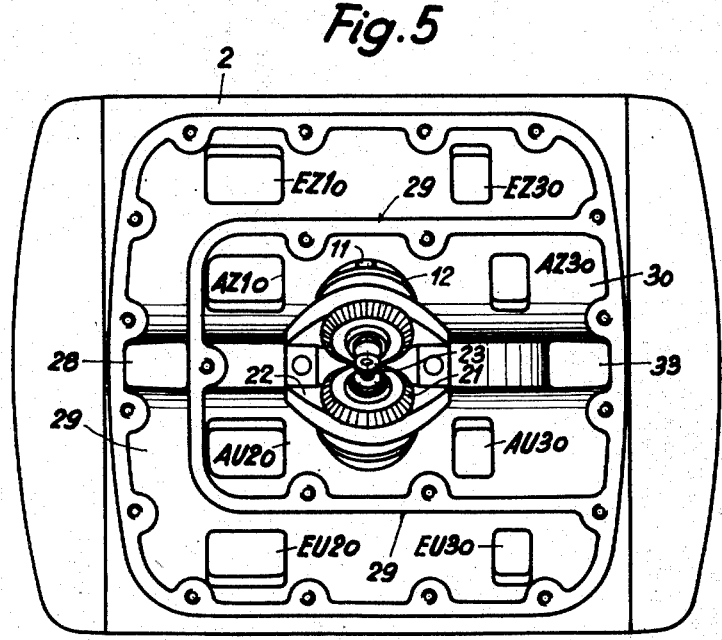
Inventor
H. Wydler Oct. 17, 1950  H. WYDLER  2,525,991
FLOWMETER
Filed May 29, 1947  6 Sheets-Sheet 3
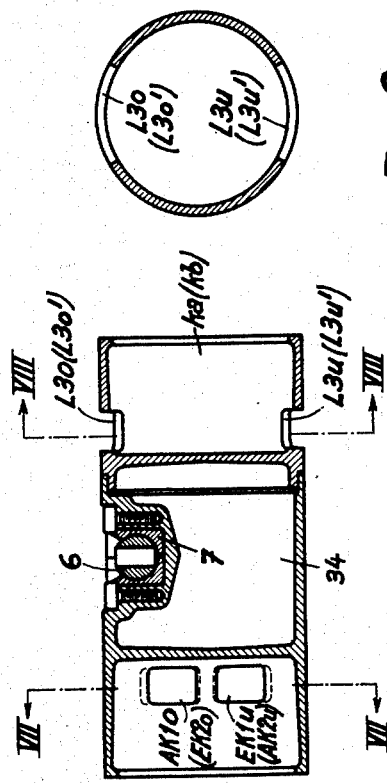
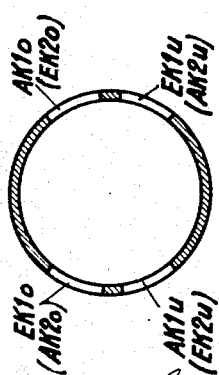
Inventor
H. Wydler

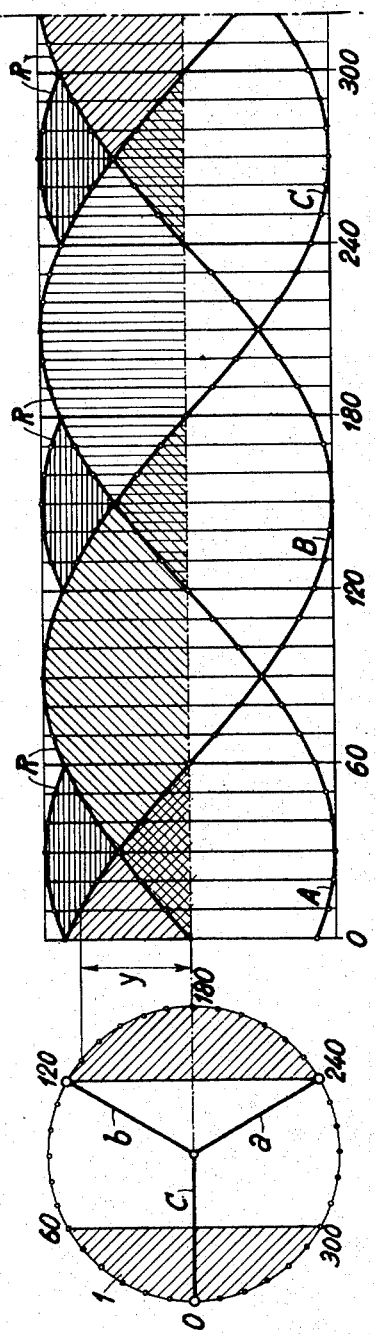

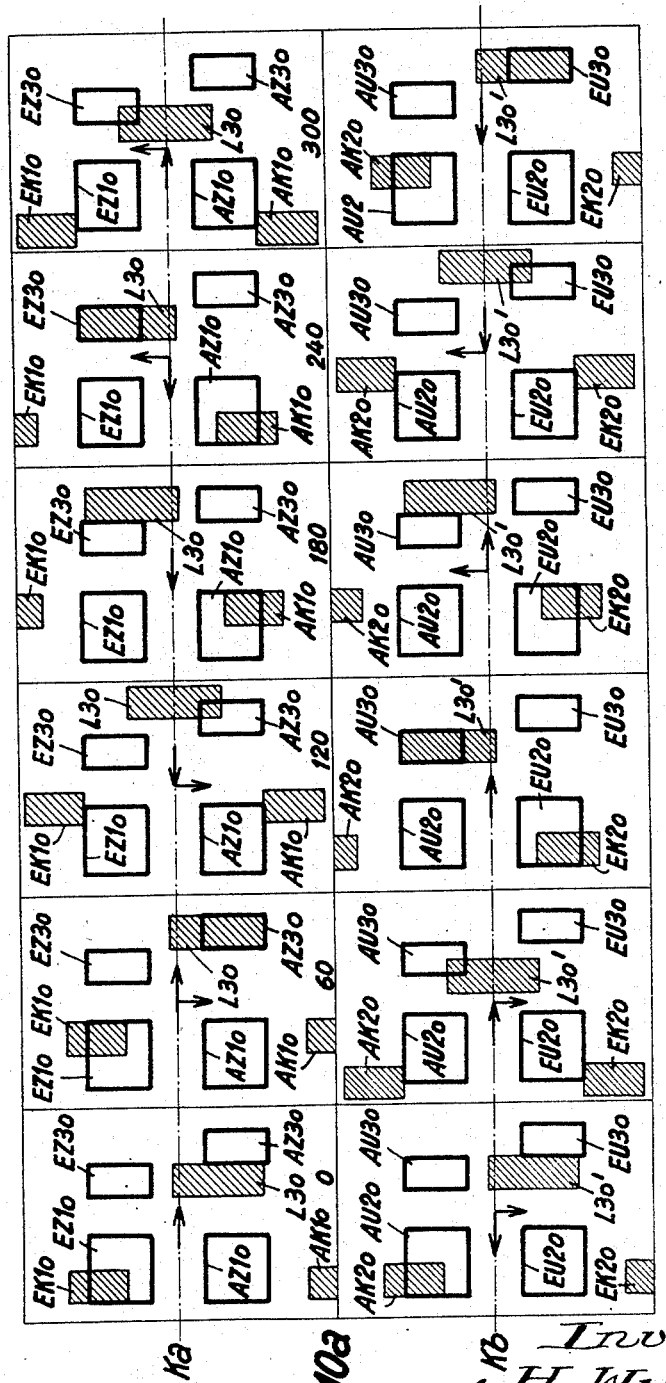

Patented Oct. 17, 1950

2,525,991

UNITED STATES PATENT OFFICE 2,525,991

FLOWMETER

Hermann Wydler, Liebefeld, near Berne, Switzerland, assignor to Stoppani A.-G., Berne, Switzerland Application May 29, 1947, Serial No. 751,377
In Switzerland September 28, 1946

4 Claims. (Cl. 73—242)

This invention relates to a flow meter of the kind shown in my copending application Serial No. 699,754, with two pistons working in three measuring chambers, the totalizer of the meter being driven through the medium of a crank mechanism.

The meter according to the invention is characterised by such an arrangement of the control channels that equalization of pressure upon the pistons in radial direction is obtained.

The attached drawing shows, by way of example, one embodiment of the invention.

Fig. 4 is a section along the line IV—IV in Fig. 1,

Fig. 5 is a top view of the flow meter with the cover removed,

Fig. 6 is a longitudinal section through the pistons, the reference characters in parenthesis belonging to piston $kb$, the others to piston $ka$.

Figs. 7 and 8 are cross sections through this piston along the lines VII—VII and VIII—VIII respectively of Fig. 6.

Fig. 9 shows the inlet and outlet control and output diagrams of the meter.

Figs. 10 and 10a illustrate schematically the relative positions of the inlet and outlet control slots of the pistons and measuring chambers in six different positions of the pistons, corresponding to six positions of the crank at intervals of 60° along the crank circle, Fig. 10 relating to the lower, and Fig. 10a to the upper control slots.

Figure 1:
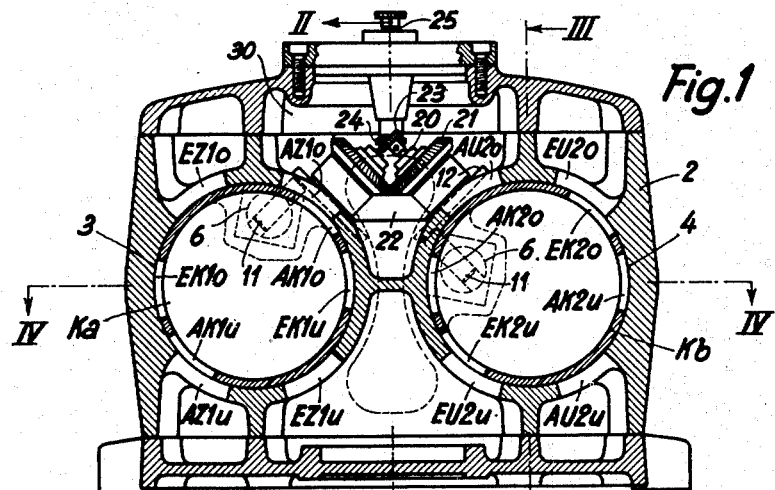
Fig. 1 is a cross section of the meter through the cylinders.

The space covered by the area of the piston-head during one stroke within the cylinder bore is called in flow meters a measuring chamber. A liquid flowing from a tank (e. g. a petrol tank) during a certain time can be measured by the addition of the number of contents of the measuring chambers poured out, whereby the last stroke of the pistons may be incomplete. In practice, the total contents of liquid can be measured by means of a totalizer. But this is only possible on the condition that the rate of counting is proportional to the contents of the measuring chambers flowing through the meter per unit of time. As already mentioned, this is only approximately made possible by the use of several pistons.

Fig. 9 represents diagrammatically the circle through which the cranks move in the case of three pistons working with a difference in phase of 120° between one another. The radius of each crank is designated by $a$, $b$ and $c$, respectively. The diagram on the right hand side of Fig. 9 represents the momentary output curves of the three pistons for different angles of rotation during one turn of the crank. The ordinate $y$ usually represents the magnitude of output in volume for different momentary positions of a crank along the circle of rotation. Now, by moving one crank through 360° along the circle of rotation in the clockwise direction, the sine curve A of the output diagram can be constructed. The same is to be said of the cranks $b$ and $c$, giving rise to sine curves B and C, respectively. By adding the momentary output represented by the points on the curves A and B algebraically, the resultant will be found to correspond to the ordinate $y$ of the curve C, but with a negative sign. This means that the algebraical addition of the capacities of symmetrical cylinder portions at the opposite end of the pistons to which two of the measuring chambers correspond, pistons, say, controlled by the cranks $a$ and $b$, is equal to the capacity of the third cylinder, so that the third piston with crank $c$ can be left away, as long as the two other above mentioned cylinder portions communicate so as to form a third measuring chamber. In this manner, a flow meter can be constructed with two pistons working in three measuring chambers.

The resultant output curve R of the meter, i. e. the resulting momentary output in function of the angle of rotation of the cranks, is obtained by addition of the positive ordinates $y$ in the output diagram lying above points along the abscissa. It can be seen that the curve R takes the approximate form of a horizontal straight line, which means that the imperfections are small. Experiment has shown that these imperfections are smaller than in any other known method. This method has already been described and claimed in my above-mentioned copending application. While, however, in the embodiment shown in my application Ser. No. 699,754 all the control openings through the cylinders are arranged on the lower halves of the latter, the pistons being thus under a one-sided pressure effect in radial direction, in the meter according to the invention the control openings on both the cylinders and the pistons are disposed in such a way that equalization of pressure upon the pistons in radial direction is obtained both during the inlet and the outlet period.

The cylinder block 2 has two parallel cylinder bores 3 and 4, in which the pistons $ka$ and $kb$ can move. Fig. 4 shows how the ends of the cylinders on the right hand side of the pistons communicate to form the third measuring chamber III, whereas the measuring chambers I and II on the other side of the pistons are separated from each other by the walls 5.

The pistons $ka$ and $kb$ control the inlet and outlet openings of the three measuring chambers I, II and III. To this end an oscillating rotary movement is imparted to the pistons in addition to the reciprocating movement caused by the liquid flowing through the chambers. For the reason of radial pressure equalization the control openings of the cylinders are arranged on the upper and the lower cylinder halves, by preference substantially diametrically opposite one another. In order to provide room for the upper control openings the crank mechanism of the embodiment shown in my copending application Ser. No. 699,754 can no longer be used. The crank device is designed as follows: A ball 6 is mounted in the pistons by means of a socket 7, and the ball 6 carries a crank pin 11 fixed to a crank disc 12. This latter is fixed to the shaft 20 of a bevelled toothed wheel 21, this shaft being mounted on a V-shaped support 22. The bevel wheels 21 of the two pistons $ka$ and $kb$ are in direct mutual engagement. To an extension of the shaft 20 a helical wheel 23 is fixed, in mesh with a helical wheel 24 of a shaft 25 leading to the totalizer (not shown). This crank mechanism is one with a crank arm of infinite length.

Each of the two pistons $ka$ and $kb$ has six control passages, that is double the number of those of the embodiment in the above-mentioned copending application. Three of these passages serve for the control of the upper cylinder half and the remaining three openings for the lower cylinder half. The openings $EK1o$ and $EK2o$ serve as an inlet for the liquid to the measuring chambers I and II through the upper cylinder halves, while the openings $EK1u$ and $Ek2u$ control the inlet into the same measuring chambers but through the lower cylinder halves. The piston slots $AK1o$ and $AK2o$ control the outlet of the liquid from the measuring chambers I and II through the upper cylinder halves while the slots $AK1u$ and $AK2u$ control the outlet from the measuring chamber I and II through the lower cylinder halves. The slot $L3o$ of the piston $ka$ and the slot $L3o'$ of the piston $kb$ serve as inlet and outlet for the measuring chamber III through the upper cylinder halves and the slot $L3u$ of the piston $ka$ and the slot $L3u'$ of the piston $kb$ control the inlet and outlet for the measuring chamber III through the lower cylinder halves.

The cylinder bore 3 has eight control passages, namely the inlets $EZ1o$, $EZ1u$, and $EZ3o$, $EZ3u$ and the outlets $AZ1o$, $AZ1u$ and $AZ3o$, $AZ3u$, the openings $EZ1o$, $EZ1u$, $AZ1o$, $AZ1u$ belonging to the measuring chamber I and the others to the chamber III. It is seen from Fig. 1 that the openings $EZ1o$ and $EZ1u$ as well as the openings $AZ1o$ and $AZ1u$ lie diametrically opposite each other. The same is to be said with regard to the measuring chamber III. Both the inlet and the outlet of the liquid thus always take place at two opposite places so that equalization of pressure in radial direction is obtained, i. e. the piston $ka$ is balanced.

Similar to the bore 3, the cylinder bore 4 has two inlets $EU2o$, $EU2u$ and two outlets $AU2o$ and $AU2u$, all for the measuring chamber II and, besides, the openings $EU3o$, $EU3u$, and $AU3o$, $AU3u$ for the measuring chamber III. Here too, as in the cylinder 3, every two openings belonging to each other lie diametrically opposite each other, so that also the piston $kb$ is balanced.

Figure 2:
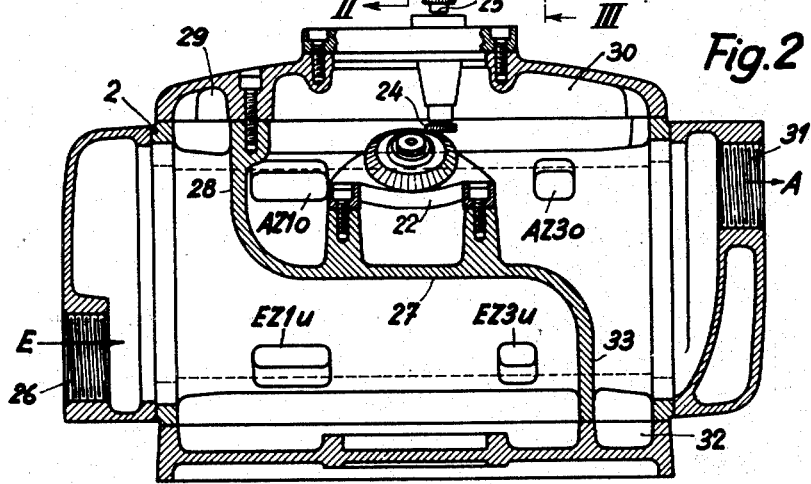
Fig. 2 is a section along the line II—II in Fig. 1.

The supply of liquid to the flow meter takes place through the inlet connection 26, part of the liquid flowing through the lower room 27 and through the lower control slots of the cylinder bores into the measuring chambers, and the other part through the ascending channel 28 (Fig. 2) into the U-shaped channel 29 (Fig. 5) and from here through the upper inlet slots of the cylinder bores 3 and 4. From the measuring chambers part of the liquid flows through the upper outlet openings of the cylinder bores into the room 30 (Figs. 1 and 2) and leaves the flow meter through the outlet connection 31, while the other part of the liquid escapes through the lower outlet slots of the cylinder bores 3 and 4 into the U-shaped channel 32 (indicated in chain-dotted lines in Fig. 4) and from here through the ascending channel 33 (Figs. 2, 5) and the outlet connection 31. From the above description and the drawings it may be seen that any crossing of channels in the flow meter is avoided.

Owing to the fact that inlet and outlet into and from the measuring chambers takes place for two different sides it becomes possible to provide the sum of the simultaneously open inlets and outlets at least equal to the cross section of the inlet and outlet connections 26 and 31 respectively and to avoid in this way high pressure losses in the flow meter.

Figure 3:
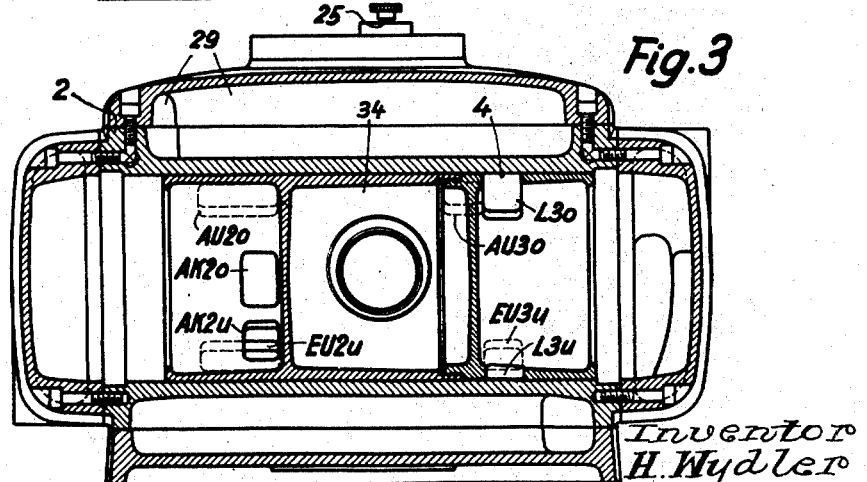
Fig. 3 is a section along the line III—III in Fig. 1.

From Fig. 3 it may be seen that the pistons are hollow in the middle part 34. Therefore, they are relatively light, so that the wear and tear of the lower half of the cylinder bores owing to the piston weight is without any importance.

Figure 10:
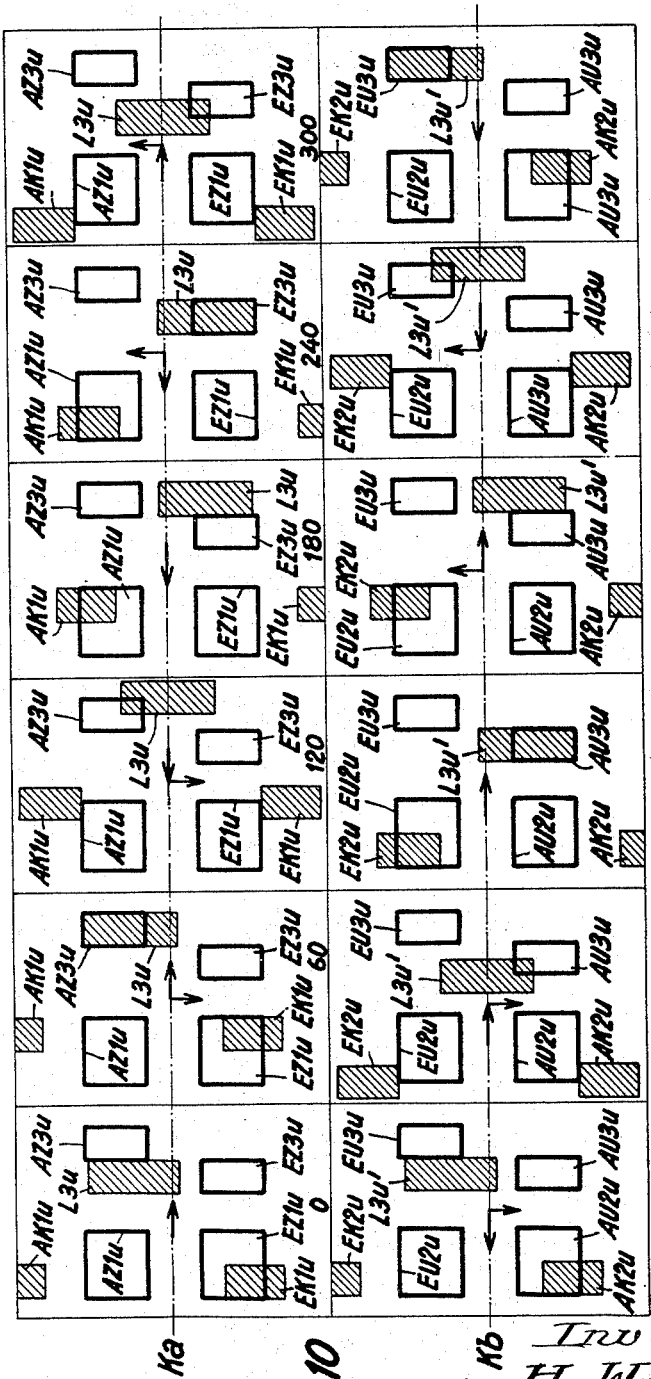

All the above mentioned cooperating openings in the pistons $ka$, $kb$ and the cylinder bores 3, 4 are so arranged that by the combined linear and oscillating rotary movement they are controlled in an adequate rhythm. This control rhythm is described below in connection with Figs. 9, 10 and 10a, Fig. 10 relating to the lower cylinder halves and Fig. 10a to the upper halves. In Figs. 10 and 10a the relative positions of the slots in the cylinder bores and piston walls are shown in six phases at intervals of 60° along the crank circle. These intervals are designated by 0, 60, 120, 180, 240 and 300 on the crank circle in Fig. 9 and correspond to the six phases designated by the same numerals in Figs. 10 and 10a. In both Figs. 10 and 10a a horizontal line divides each phase diagram in two, representing, above the line, the relative positions of the openings of the piston $ka$ and the cylinder bore 3 and, below the line, of the piston $kb$ and the cylinder bore 4.

In position 0 all the inlets and outlets to and from chamber III are closed and the cranks $a$ and $b$ lie symmetrical to the horizontal through the centre of the crank circle, i. e. in this position the two pistons lie level with each other. The inlets $EK1u$ and $EK1o$ to the chamber I are open through the slots $EZ1u$ and $EZ1o$, i. e. in this position piston $ka$ is about to receive the liquid in the chamber I. The outlets $AK2u/AU2u$ and $AK2o/AU2o$ of chamber II are open, so that the liquid is expelled from the latter. On passing from phase 0 to the next phase, chamber III begins to be emptied through the ports $L3u/AZ3u$ and $L3o/AZ3o$ under the action of the piston $ka$.

In position 60 the latter ports are widely open, while chamber III has just begun to be emptied through the ports $L3u'/AU3u$ and $L3o'/AU3o$.

Chamber I is still being filled through ports EZ1u/EK1u and EZ1o/EK1o, whereas the inlets and outlets to and from chamber II are closed. On passing from phase 60 to the next phase, the outlets from chamber III are still more opened under the influence of the piston *kb*, whereas the outlets to chamber III begin to close under the influence of the piston *ka*.

In position 120 the latter is almost closed and the outlet ports L3u'/AU3u and L3o'/AU3o are widely open under the influence of the piston *kb*. In this position, the outlets and inlets i. e. AK1u/AZ1u, EK1u/EZ1u and AK1o/AZ1o, EK1o/EZ1o from and to chamber I are completely shut. Chamber II is about to be filled through the inlet ports EK2u/EU2u and EK2o/EU2o. On passing from phase 120 to the next phase, the outlets L3u'/AU3u and L3o'/AU3o from chamber III begin to close and in position 180 chamber III is completely shut. In this way the chamber III was emptied during a half turn of the crank. Simultaneously, the chamber II was emptied on passing from phase 0 to 60 and the chamber I, from phase 120 to 180. This can be seen from the curves A, B and C in Fig. 9. On passing from phase 180 to the next phase, chamber III begins to be filled, but first of all through the piston *ka* by the ports L3u/EZ3u and L3o/EZ3o.

In position 240 the latter ports are widely open, whereas the inlets, L3u'/EU3u and L3o'/EU3o to chamber III through the piston *kb* have just begun to open. Chamber I in this phase is still being emptied through the inlets AK1u/AZ1u and AK1o/AZ1o. Chamber II is closed.

On passing from phase 240 to the next phase, the inlets L3u/EZ3u and L3o/EZ3o to chamber III through piston *ka* begin to close and the inlets L3u'/EU3u and L3o'/EU3o through piston *kb*, to open.

In position 300 the inlets L3u/EZ3u and L3o/EZ3o to chamber III through piston *ka* are almost closed, whereas the inlets L3u'/EU3u and L3o'/EU3o through piston *kb* are widely open. Now chamber I is closed. Chamber II is about to be emptied through the outlet ports AK2u/AU2u and AK2o/AU2o. On passing from phase 300 to the next phase, the inlets L3u'/EU3u and L3o'/Eu3o to chamber III through piston *kb* begin to close until the original position 0 is gained, when the cycle of phases is repeated. Again it can be seen from the curves A, B, and C in Fig. 9, that during the time that chamber III (curve C) is filled, i. e. during phases 180 to 0, chamber I (curve A) and chamber II (curve B) are emptied between phases 180 to 300 and 240 to 0, respectively.

The partition walls between the openings EK1o and AK1u, AK1o and EK1u, EK2u and AK2o, EK2o and AK2u might even be done away with.

What I claim is:

1. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders, said control ports being arranged in axially disposed pairs with the ports of each pair lying substantially diametrically opposite to each other, and there being control openings in the walls of said pistons, said control openings being arranged in axially disposed pairs with the openings of each pair lying diametrically opposite to each other to transitorily and simultaneously register with two diametrically opposite control ports, and means for causing oscillation of said pistons to change the mutual position of said control ports and said control openings to control the inlet and outlet to and from said three measuring chambers simultaneously on two diametrically opposite sides of the axes of said cylinders.

2. In a flow meter, an inlet connection, an outlet connection, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders, said control ports being arranged in axially disposed pairs with the ports of each pair lying substantially diametrically opposite to each other, and there being control openings in the walls of said pistons, said control openings being arranged in axially disposed pairs with the openings of each pair lying diametrically opposite to each other to transitorily and simultaneously register with two diametrically opposite control ports, the sum of the simultaneously open inlet control ports and control openings respectively, and the outlet control ports and control openings respectively being at least equal to the cross section of said inlet connection, and of said outlet connection, and means for causing oscillation of said pistons to change the mutual position of said control ports and said control openings to control the inlet and outlet to and from said three measuring chambers simultaneously on two diametrically opposite sides of the axes of said cylinders.

3. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders, said control ports being arranged in axially disposed pairs with the ports of each pair lying substantially diametrically opposite to each other, and there being control openings in the walls of said pistons, said control openings being arranged in axially disposed pairs with the openings of each pair lying diametrically opposite to each other to transitorily and simultaneously register with two diametrically opposite control ports, a totalizer-driving bevelled wheel in direct driving connection with one of said pistons, and another bevelled wheel in engagement with said former bevelled wheel, in direct driving connection with the other piston.

4. In a flow meter, an inlet connection, an outlet connection, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders, said control ports being arranged in axially disposed pairs with the ports of each pair lying substantially diametrically opposite to each other, and there being control openings in the walls of said pistons, said control openings being arranged in axially disposed pairs with the openings of each pair lying diametrically opposite to each other to transitorily and simultaneously register with two diametrically opposite control ports, the sum of the simultaneously open inlet control ports and control openings respectively, and the outlet control ports and control openings respectively being at least equal to the cross section of said inlet connection, and of said outlet connection, a totalizer-driving bevelled wheel in direct driving connection with one of said pistons, and another bevelled wheel in engagement with said former bevelled wheel, in direct driving connection with the other piston.

HERMANN WYDLER.

REFERENCES CITED

The following references are of record in the file of this patent:

UNITED STATES PATENTS

| Number | Name | Date |
|---|---|---|
| 1,811,789 | Granberg | June 23, 1931 |
| 2,399,316 | Berck | Apr. 30, 1946 |

FOREIGN PATENTS

| Number | Country | Date |
|---|---|---|
| 763,563 | France | Feb. 12, 1934 |